(No Model.) 2 Sheets—Sheet 1.

W. ROBINSON.
STREET RAILWAY CAR.

No. 243,796. Patented July 5, 1881.

WITNESSES
Henry W Williams
Arthur H. Bridge

INVENTOR
William Robinson

N. PETERS, Photo-Lithographer, Washington, D. C.

(No Model.) 2 Sheets—Sheet 2.

W. ROBINSON.
STREET RAILWAY CAR.

No. 243,796. Patented July 5, 1881.

WITNESSES.
Henry W Williams
Arthur H Bridge

INVENTOR.
William Robinson

UNITED STATES PATENT OFFICE.

WILLIAM ROBINSON, OF BOSTON, MASSACHUSETTS.

STREET-RAILWAY CAR.

SPECIFICATION forming part of Letters Patent No. 243,796, dated July 5, 1881.

Application filed November 29, 1880. (No model.)

*To all whom it may concern:*

Be it known that I, WILLIAM ROBINSON, of Boston, in the county of Suffolk and State of Massachusetts, have invented new and useful Improvements in Street-Railway Cars, of which the following is a specification.

This invention is intended to provide means, in a street-railway or other four-wheeled car, for so radiating the axles that, while they will always be at right angles to the line of the track when the track is straight, they will, when the track is curved, take positions on radial lines with the circle or arc of the circle described by that portion of the track. The axles may be caused to take these positions— *i. e.*, a right-angled position when passing over a straight track and a radial position when passing over a curved track—by the horses acting upon the forward truck, and thence upon the rear truck, such action being, if desired, within the power of the driver to prevent, or by mechanism operated entirely by the driver, all as fully described below.

The objects of the invention are to lessen friction upon curves, thereby saving much strain upon the horses and considerable wear of wheels and track, and to reduce the danger of the wheels leaving the track.

Figure 1:
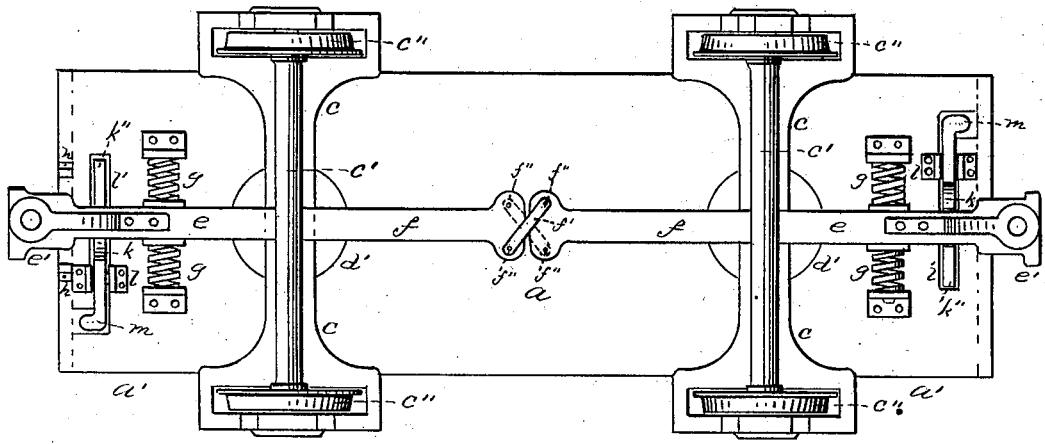
Figure 2:
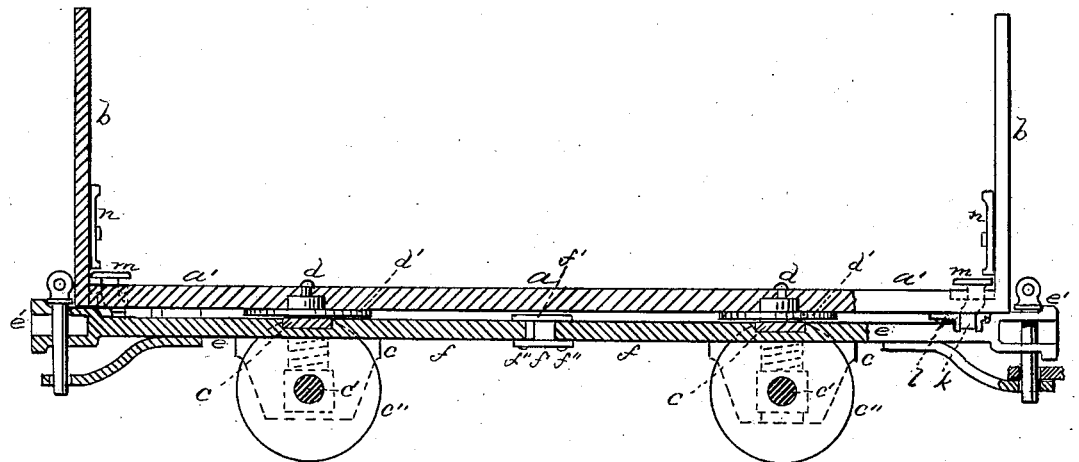
Figure 3:
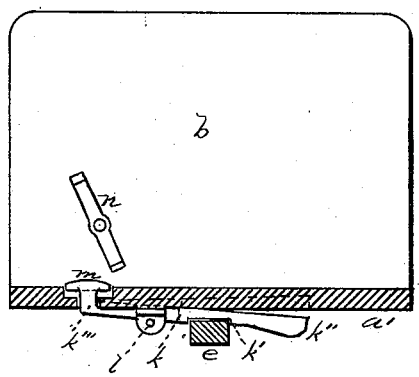
Figure 4:
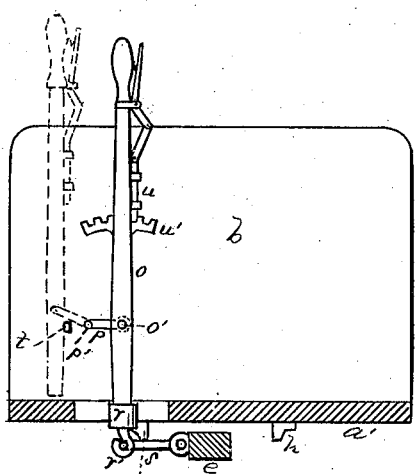
Figure 5:
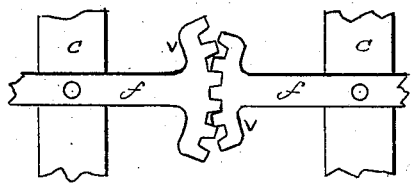
Figure 6:
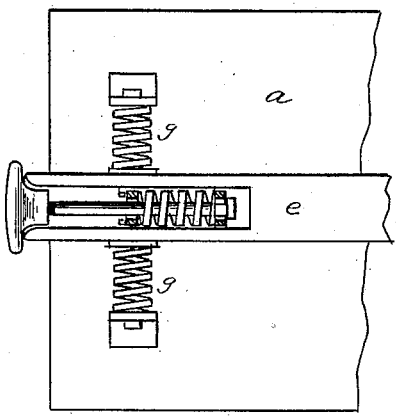

In the accompanying drawings, in which similar letters of reference indicate like parts, Figure 1 is a plan view of the under side of a street-railway car embodying my invention. Fig. 2 is a longitudinal vertical section of the same, a portion of one end being shown in elevation. Fig. 3 is a transverse vertical section taken just inside the dash-board. Fig. 4 is a transverse section of the platform. Figs. 5 and 6 show modifications of parts of the mechanism employed.

$a$ represents the bottom or floor of the car, and $b\ b$ the dash-boards.

$c\ c$ are trucks, pivoted at $d\ d$ and supporting the axles $c'\ c'$ and wheels $c''\ c''$. A plate or large washer, $d'$, is placed between each truck and the car-bottom, and other plates or supporting intermediate pieces may be placed under the car, above the trucks, near their ends, if desired; or the trucks may be built up so as to rest against the car-bottom near their ends, so as to prevent straining or springing.

$e\ e$ are bars secured to the trucks, and extending outwardly to or terminating in the draw-bars $e'\ e'$.

$f\ f$ are bars secured to the trucks, and extending inwardly toward each other, and connected together by the two crossing links $f'\ f'$, each pivoted to both bars $f\ f$ at $f''\ f''$. Preferably the links $f'\ f'$ are placed upon the upper and under sides of the bars $f\ f$.

The bars $e$ and $f$ may be of any shape or number so long as the former are fixed to the trucks and pass to the draw-bars and the latter are fixed to the trucks and connect with each other, substantially as shown.

As the horse commences to draw the car around a curve he swings the draw-bar $e'$, and hence the bar $e$, toward one side, thus radiating the forward axle, and by means of the bars $f\ f$ and their connections the rear axle, both axles taking positions on lines which are radii of the same circle. Hence unnecessary friction is avoided and the wheels run smoothly around the curve. Suitable springs, $g\ g$, are provided to assist the trucks back into their normal position, and stops $h\ h$ to prevent too much turn.

There being in use in some cities devices called "platform-switches," which are operated by driving the horses toward one side of the track upon them, and for other reasons, I have provided means for locking the trucks and allowing them to be released at the will of the driver, so that they may not be radiated until desired. A lever, $k$, hinged at $l$ under the car, (see Fig. 3,) is provided with a groove, $k'$, fitting over bar $e$, and is made heavier at its end $k''$, and bends at $k'''$ upward, passing through the car-bottom and terminating in the head $m$. When the lever is in its normal position the truck is locked. When the driver desires to allow the trucks to be radiated by the horses, he presses the head $m$ of the lever $k$, thus raising it from the bar $e$ into the space $l'$ in the car-bottom (see Fig. 1) provided for it. The bar $e$, and hence the trucks, are then free to turn. Releasing the lever again when the groove $k'$ is over the bar $e$ locks the bar and trucks. As the levers $k$ are placed at both ends of the car, the bar $e$ at the rear end must be left unlocked in order that the rear truck may be radiated by the forward truck. Hence buttons $n$ or similar devices are provided, the rear buttons pressing down the head m of the rear lever, k. Of course both levers may be pressed away from the bars e, if desired, and this would ordinarily be the case on a railroad where no platform-switches were employed. The levers k may be held upon the bars e by springs, if thought best, in order to make their action more positive.

Fig. 4 is a transverse section of the platform just inside the dash-board, and shows means for causing the tracks to be radiated by the driver. The trucks are radiated by swinging the lever o, which is placed at one side for convenience' sake. This lever o is pivoted at o' to the short rod p, pivoted at p' to the dash-board. The lower end of the lever o lies in the socket r, supported by a hook or similar device, r', loosely connected by rod s to the bar e operating the truck.

Of course there may be many modifications of the connection between the lever o and the bar e.

If it is desired to have the trucks free, the lever o may be lifted from the socket r and dropped into the position shown in broken lines, the rod p resting on the stud t.

Any convenient locking device, such as the well-known one shown by letters u u', may be used for locking the lever o.

Fig. 5 is a plan of a modification, showing, instead of the bar or link connection f' f', segment-gears v v, fixed to or integral with the bars f f and meshing into each other.

Fig. 6 is a plan view of the under side of a four-wheeled steam-railway car, there being many such in use for hauling coal, &c., in which the draw-bar is placed inside the bar e, which is bifurcated for the purpose. The play of the draw-bar is somewhat limited, but what play there is affects the truck through the bar e. In this case the draw-bar is, as usual in steam-railway cars, secured to the car-body.

I propose to apply my invention to vehicles of any kind, such as drays, trucks, &c., as far as practicable.

The springs g g, although preferably applied to the bars e e, may be applied to the bars f f, or directly to the truck, the main objects being to steady and limit the movement of said trucks.

In place of the lever k, a pin might be employed and adapted to drop through a hole in the platform into the bar e, thus locking the trucks.

I am aware that it is not novel in a car or carriage to provide a swiveling forward truck with a bar which, connecting with the draw-bar, turns the said truck on its axis.

Having thus fully described my invention, what I claim, and desire to secure by Letters Patent, is—

1. In a four-wheeled car or other vehicle, the combination, with single swiveling trucks—i. e., trucks each of which carries two wheels only—of bars e e or other connecting devices rigidly secured at their inner ends to the trucks, and adapted to be swung horizontally by the draw-bars, which are integral with said trucks, or connected with their outer ends, said trucks being connected with each other in such a manner that the radiation of one truck communicates exactly similar radiation to the other truck, the radiation of the trucks being caused by power applied to said rigid connections, substantially as and for the purpose set forth.

2. In combination with the bar e or other connecting device rigidly applied to the truck c and extending to the forward end of the car, substantially as shown, the lever o, pivoted at o', having its lower end detachably connected directly or indirectly with said bar, and adapted to swing it horizontally, thus radiating the trucks, substantially as specified.

3. In combination with the trucks c and car-body a, the springs g g, applied to the car-body or to any rigid connection of the same, and bearing against the trucks or any rigid connection thereof, substantially as and for the purpose specified.

WILLIAM ROBINSON.

Witnesses:
HENRY W. WILLIAMS,
ARTHUR H. BRIDGE.